US011251747B2

(12) United States Patent
Franklin et al.

(10) Patent No.: US 11,251,747 B2
(45) Date of Patent: Feb. 15, 2022

(54) PHOTOVOLTAIC MODULE MOUNTING SYSTEM

(71) Applicant: LUMOS SOLAR, LLC, Nederland, CO (US)

(72) Inventors: Scott Franklin, Nederland, CO (US); Brian Rafferty, Longmont, CO (US); Keith Yzquierdo, Lyons, CO (US)

(73) Assignee: LUMOS SOLAR, LLC, Nederland, CO (US)

( * ) Notice: Subject to any disclaimer, the term of this patent is extended or adjusted under 35 U.S.C. 154(b) by 187 days.

(21) Appl. No.: 15/671,879

(22) Filed: Aug. 8, 2017

(65) Prior Publication Data

US 2018/0048261 A1 Feb. 15, 2018

Related U.S. Application Data

(60) Provisional application No. 62/372,566, filed on Aug. 9, 2016.

(51) Int. Cl.
*H02S 30/10* (2014.01)
*H02S 20/23* (2014.01)
*F24S 25/636* (2018.01)
*F24S 25/632* (2018.01)

(52) U.S. Cl.
CPC ............ *H02S 30/10* (2014.12); *F24S 25/632* (2018.05); *F24S 25/636* (2018.05); *H02S 20/23* (2014.12); *Y02B 10/10* (2013.01)

(58) Field of Classification Search
CPC .................................. H02S 30/10; H02S 20/23
See application file for complete search history.

(56) References Cited

U.S. PATENT DOCUMENTS

| | | | |
|---|---|---|---|
| 2005/0145274 A1* | 7/2005 | Polce | H01L 31/048 136/244 |
| 2012/0125410 A1* | 5/2012 | West | H02S 20/23 136/251 |
| 2015/0361668 A1* | 12/2015 | Stearns | F24S 25/636 52/698 |
| 2017/0040928 A1* | 2/2017 | Schuit | H02S 20/23 |

\* cited by examiner

*Primary Examiner* — Tae-Sik Kang
(74) *Attorney, Agent, or Firm* — Hoffmann and Baron, LLP

(57) ABSTRACT

A photovoltaic mounting system including a photovoltaic module having a panel having an upper surface including a plurality of photocells and an opposed bottom surface, the module being bounded by a perimeter edge. A mounting frame is secured to the bottom surface of the module. The mounting frame is offset from each of the perimeter edges of the module. The mounting frame includes an upper surface secured to the module and an opposed lower end having a mounting projection.

12 Claims, 11 Drawing Sheets

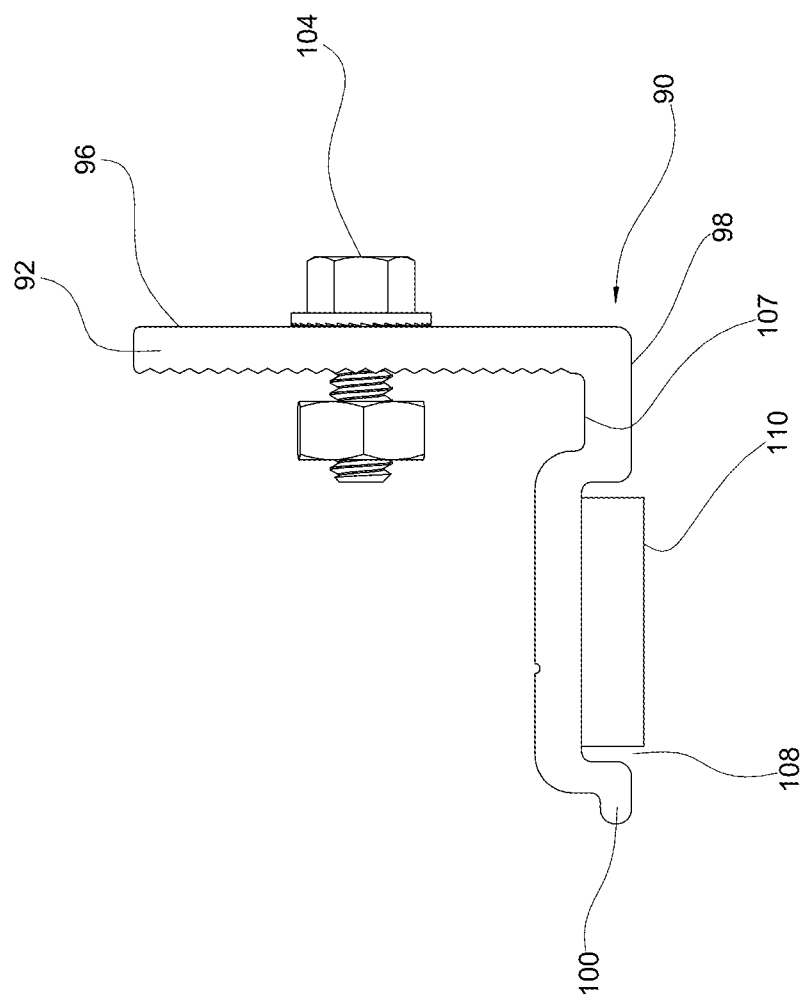

PHOTOVOLTAIC MODULE MOUNTING SYSTEM

This application claims the benefit of priority to U.S. Provisional Application Ser. No. 62/372,566 filed on Aug. 9, 2016 the content of which is incorporated by reference herein in its entirety.

FIELD OF INVENTION

The present invention relates to a system and method for securing modules and more particularly to a system and method for securing photovoltaic modules to a structure.

BACKGROUND OF THE INVENTION

Photovoltaic ("PV") modules, also known as solar modules, are well known in the art for converting solar energy into electrical energy. As the desirability for clean and efficient energy sources increases, so does the desire to use power sources such as PV modules.

PV modules are typically mounted on a structure, such as a roof of a house or building where they are readily exposed to sunlight. Since the modules are exposed to the environment, they need to be properly secured to the structure so they can withstand winds and other environmental effects. Photovoltaic modules are typically secured to structures by way of elongated rails secured to the structure. It is known to use various clamps and hardware which are securable by a threaded bolt and nut to an elongated rail. The clamps may be positioned to engage and secure the PV modules.

PV modules may be surrounded by a frame which provides some protection to the edges of the panel and provides a means for mounting the modules to a structure. PV mounting systems of the prior art require the securement and adjustment of numerous fastening elements to secure the PV modules. In addition, adjustments as to the position of each module is often required which is time consuming and increases the complexity and cost of installation. In addition, installations typically have the mounting hardware engage the edge of the module. Therefore, the module edges cannot be placed in close proximity to each other. Such a mounting system also leaves exposed the mounting hardware and rails which negatively affects the aesthetics of an installation.

Accordingly, it would be desirable to provide a system and method for securing PV modules to a structure in a secure and efficient manner.

SUMMARY

The present disclosure provides a photovoltaic mounting system including a photovoltaic module having a panel which has an upper surface including a plurality of photocells and an opposed bottom surface, the module being bounded by a perimeter edge. A mounting frame is secured to the bottom surface of the module. The mounting frame is offset from each of the perimeter edges of the module. The mounting frame includes an upper surface secured to the module and an opposed lower end having a mounting projection.

The present invention also provides a photovoltaic mounting system including a photovoltaic module having an upper surface including a plurality of photocells and an opposed bottom surface. The module is bounded by a perimeter edge. A mounting frame is secured to the bottom surface of the module. The mounting frame is offset from each of the perimeter edges of the module. The mounting frame includes an upper surface secured to the module and an opposed mounting projection. A pair of spaced mounting rails includes a plurality of retainers thereon. The retainers engage the mounting frame for securing the module to the rails.

The present invention further provides a photovoltaic module including a photovoltaic panel having an upper surface including a plurality of photocells and an opposed bottom surface. The panel is bounded by a perimeter edge. A mounting frame is secured to the panel bottom surface. The mounting frame is offset from each of the perimeter edges of the panel. The mounting frame includes an upper surface secured to the module and an opposed lower end having a mounting projection adapted to secure the photovoltaic module to a rail.

BRIEF DESCRIPTION OF THE DRAWINGS

FIG. 11 is a side elevational view of the mounting bracket.

DETAILED DESCRIPTION

Figure 1:
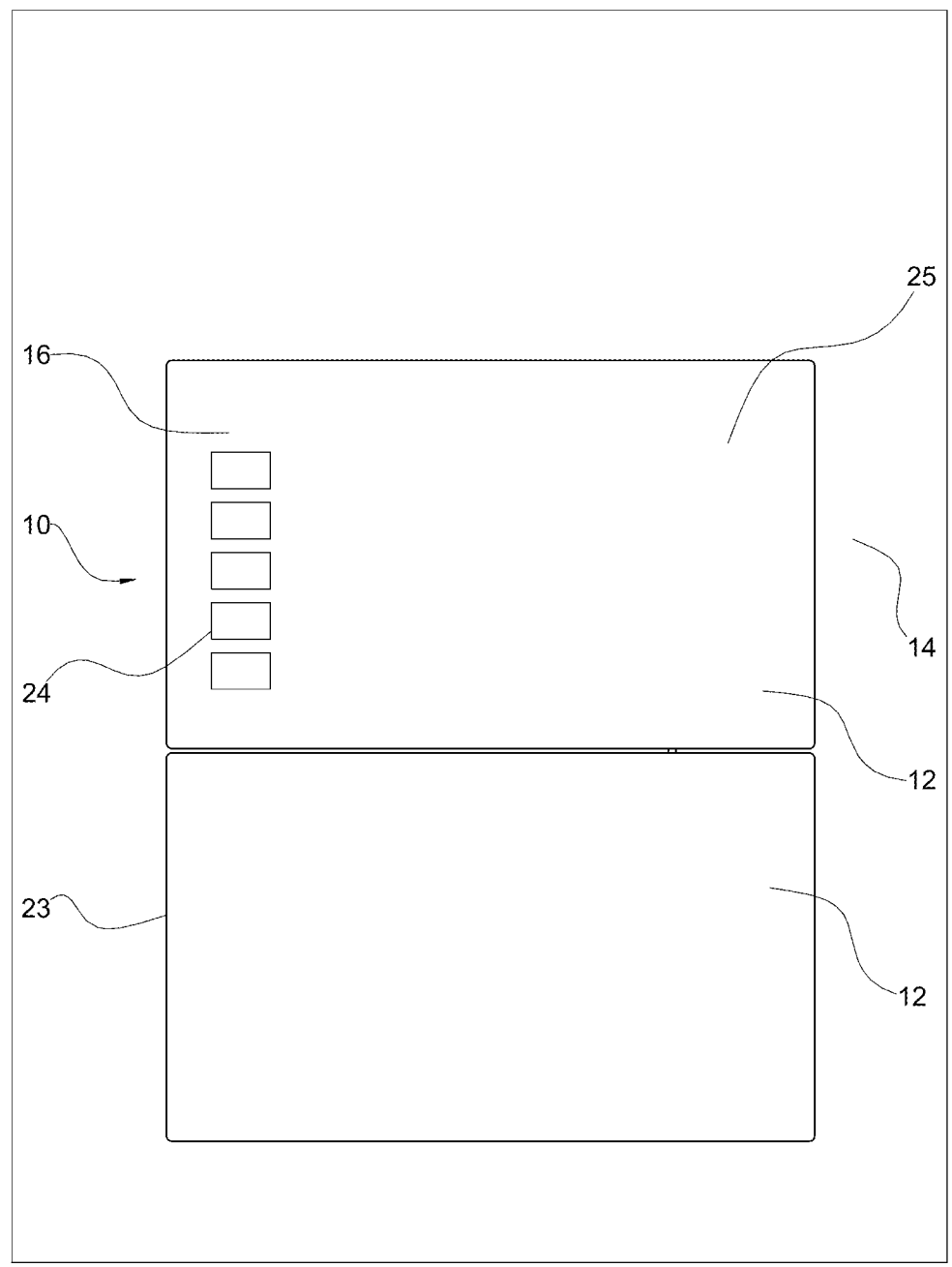
FIG. 1 is a top plan view of PV modules secured to a structure.
Figure 2:
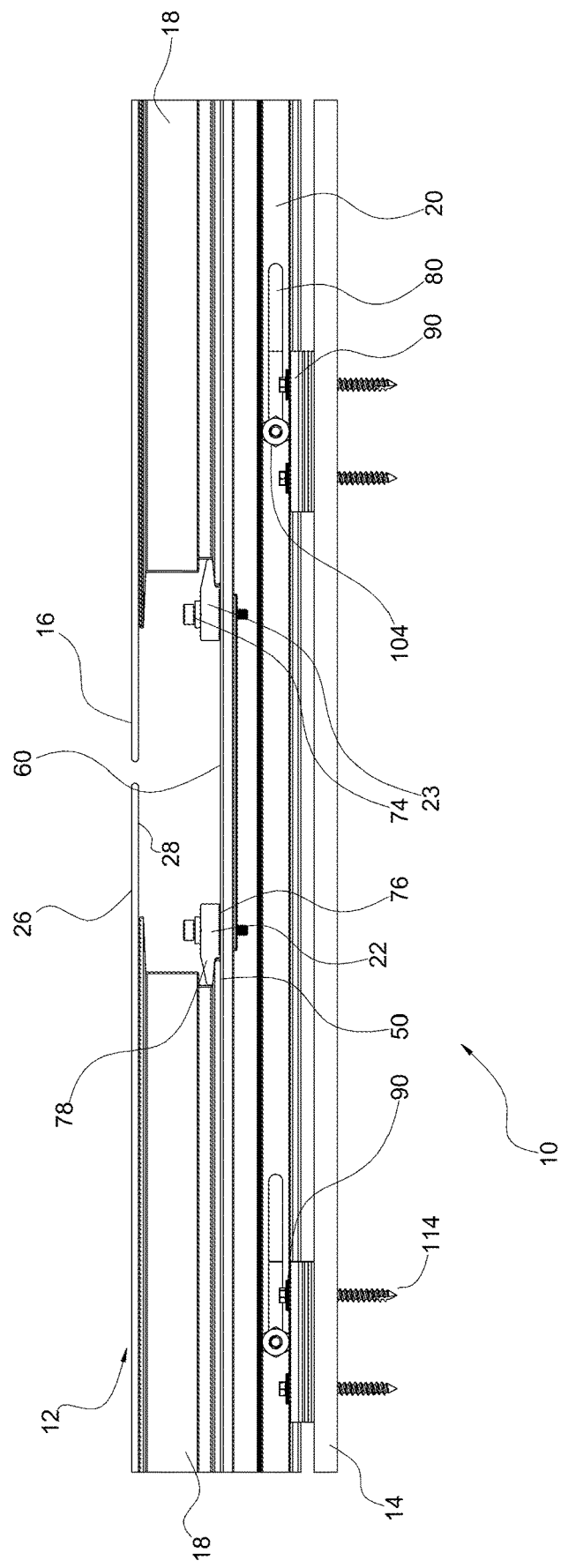
FIG. 2 is a partial side elevational view of PV modules secured to a structure.
Figure 3:
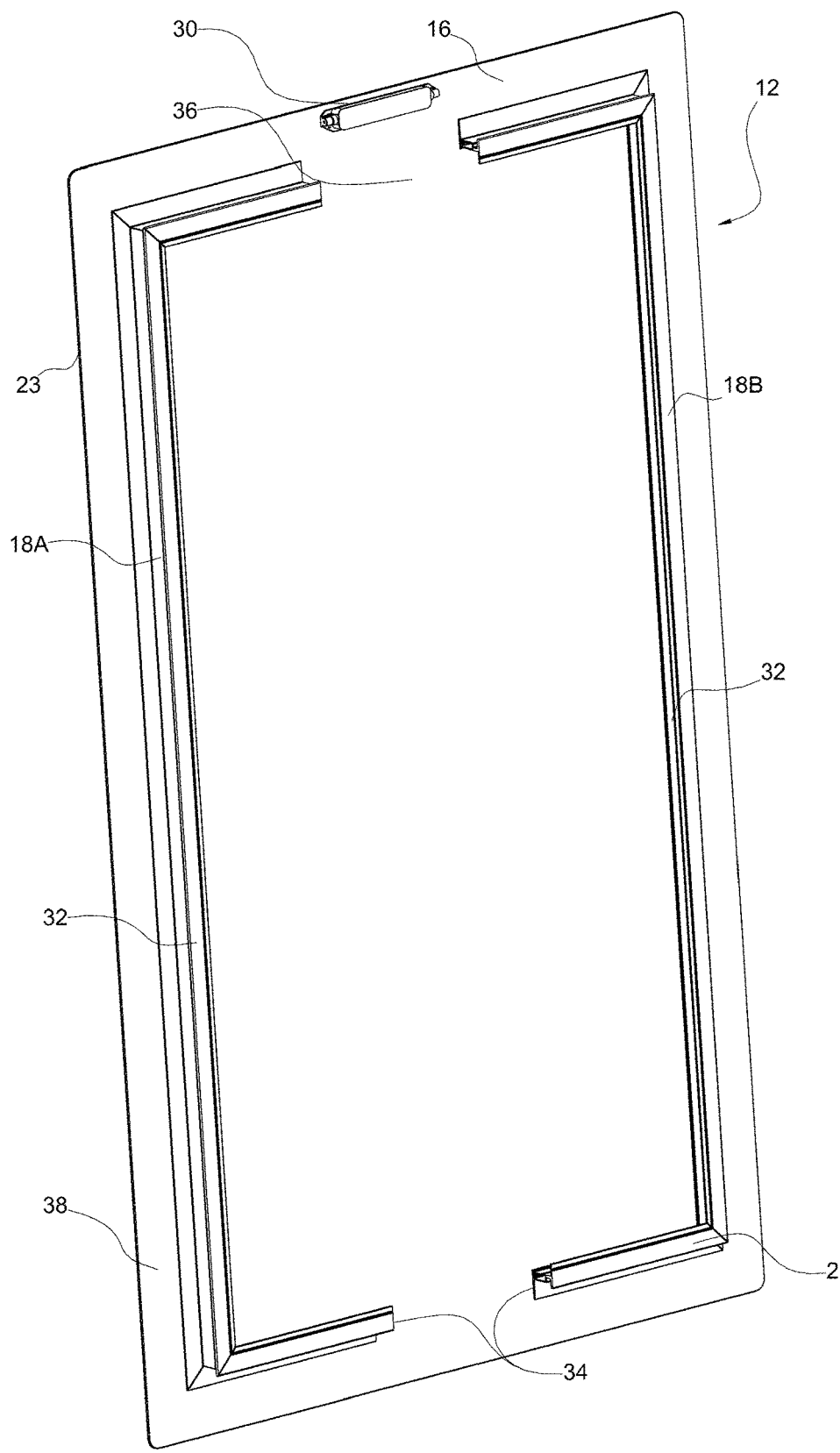
FIG. 3 is a bottom perspective view of a PV module.

With reference to FIGS. 1-3, the photovoltaic ("PV") module mounting system 10 of the present disclosure permits PV modules 12 to be efficiently and securely mounted to a support structure 14. The system 10 includes one or more PV modules 12 which include a PV panel 16 having a mounting frame 18 secured to the bottom thereof. The system further includes a plurality of mounting rails 20 having retainers 22 that securely fasten the PV modules 12 to the rails.

Figure 4:
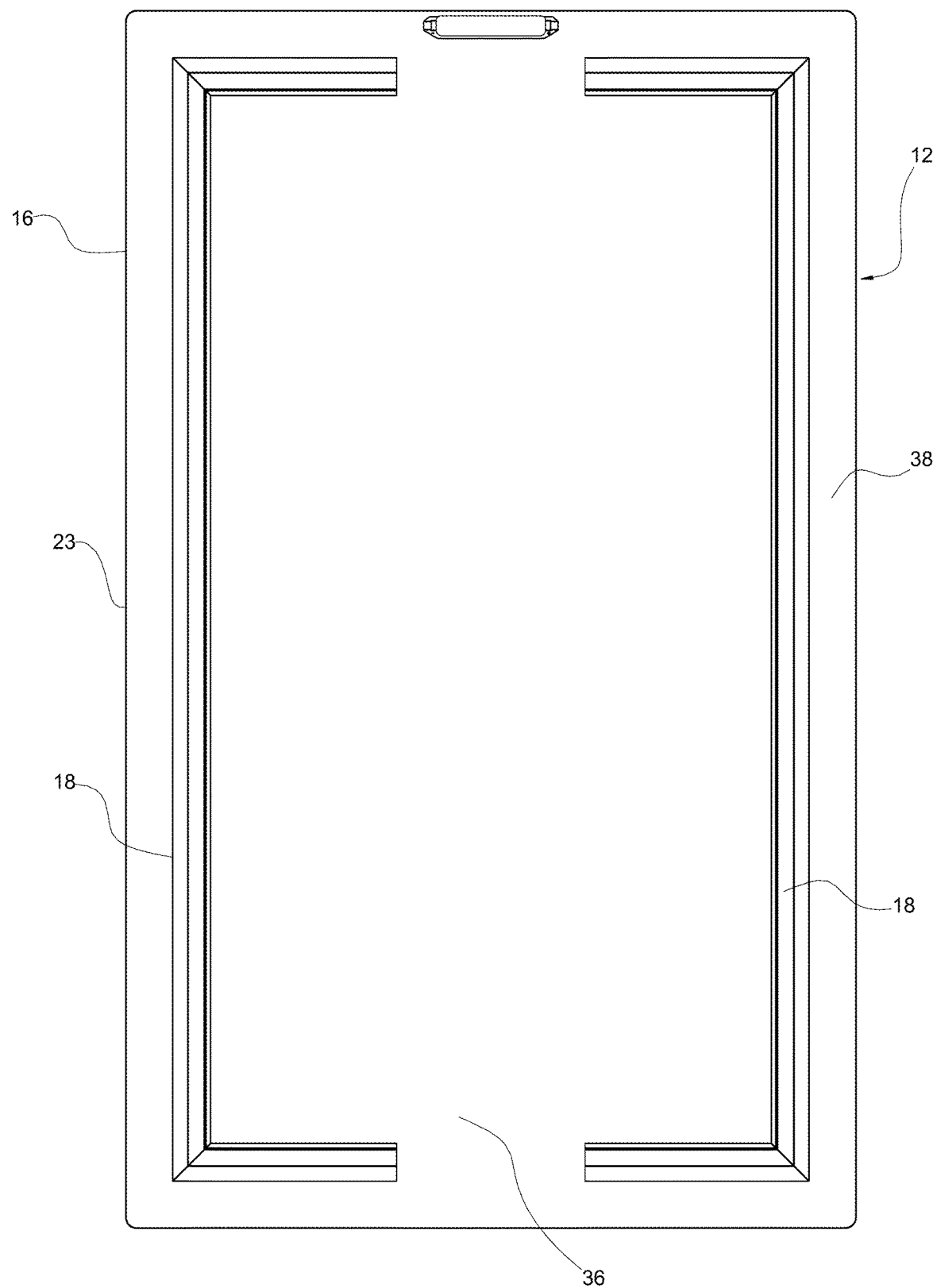
FIG. 4 bottom plan view of a PV module.

With reference to FIGS. 1, 3 and 4, the PV module 12 includes a generally planar PV panel that is bounded by a perimeter 23 formed of a plurality of interconnecting edges. The PV panel includes a plurality of photovoltaic cells 24 for generating electricity. The PV module 12 includes a top surface 26 which is faced toward the sun and may be formed of a transparent material such as glass that covers the photovoltaic cells 24. Opposite the top surface is a bottom surface 28 to which the mounting frame 18 is secured. The bottom surface 28 may also include an electrical connector 30 operably connected to the photo cells. The connector 30 provides a termination for connecting the PV module 12 to a power distribution system.

Figure 5:
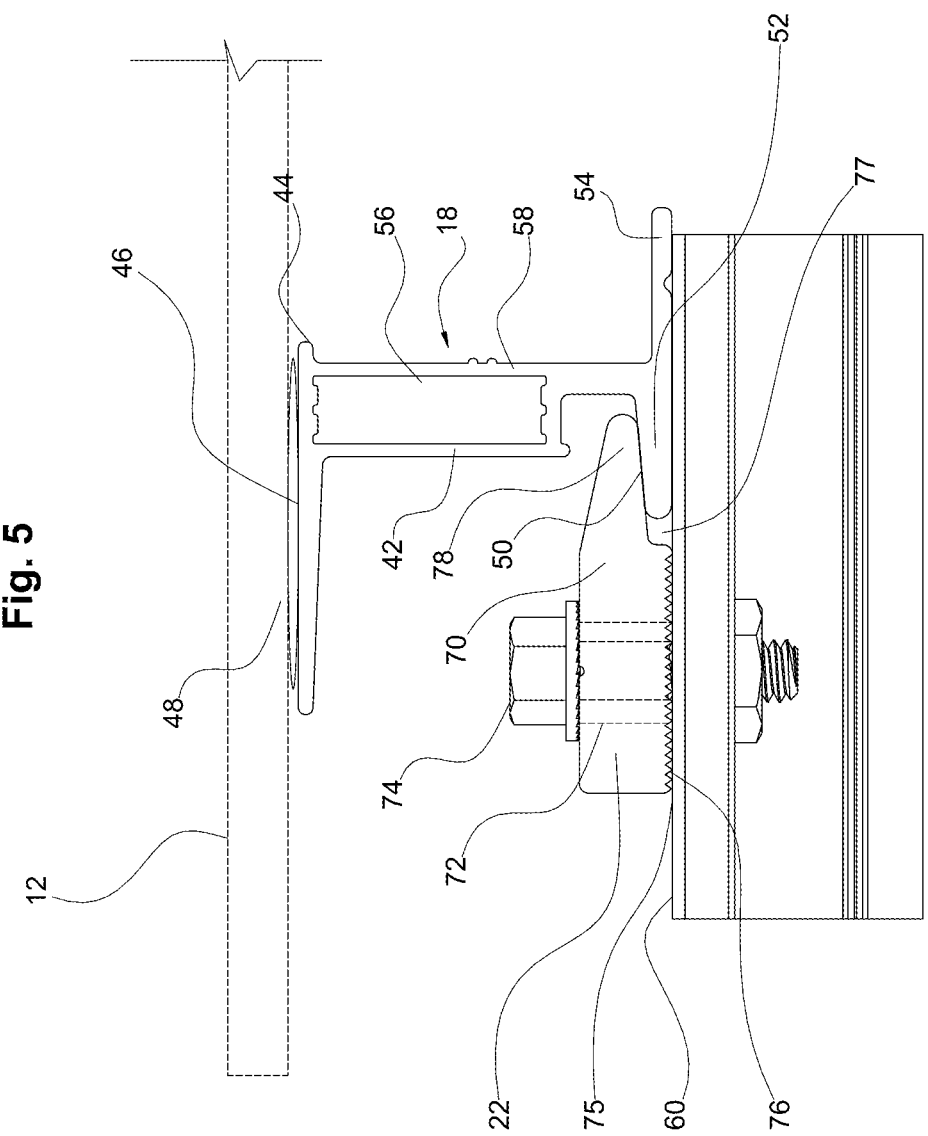
FIG. 5 is an end view of a PV module mounting frame.
Figure 6:
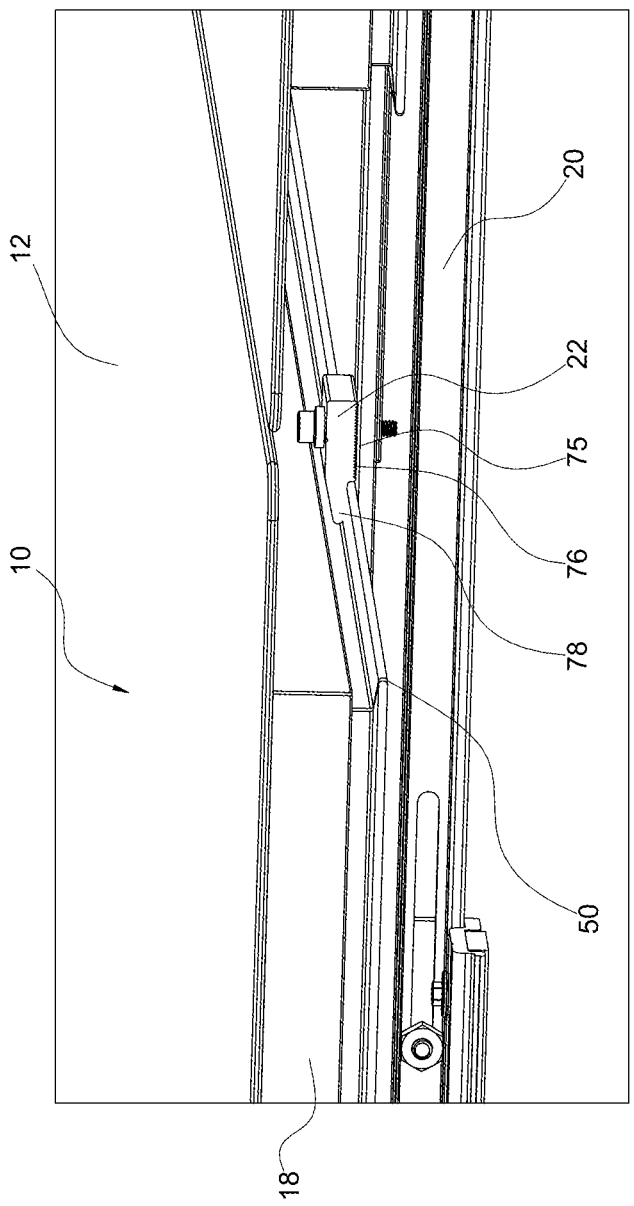
FIG. 6 is a partial perspective view of a PV module mounted to a rail.
Figure 7:
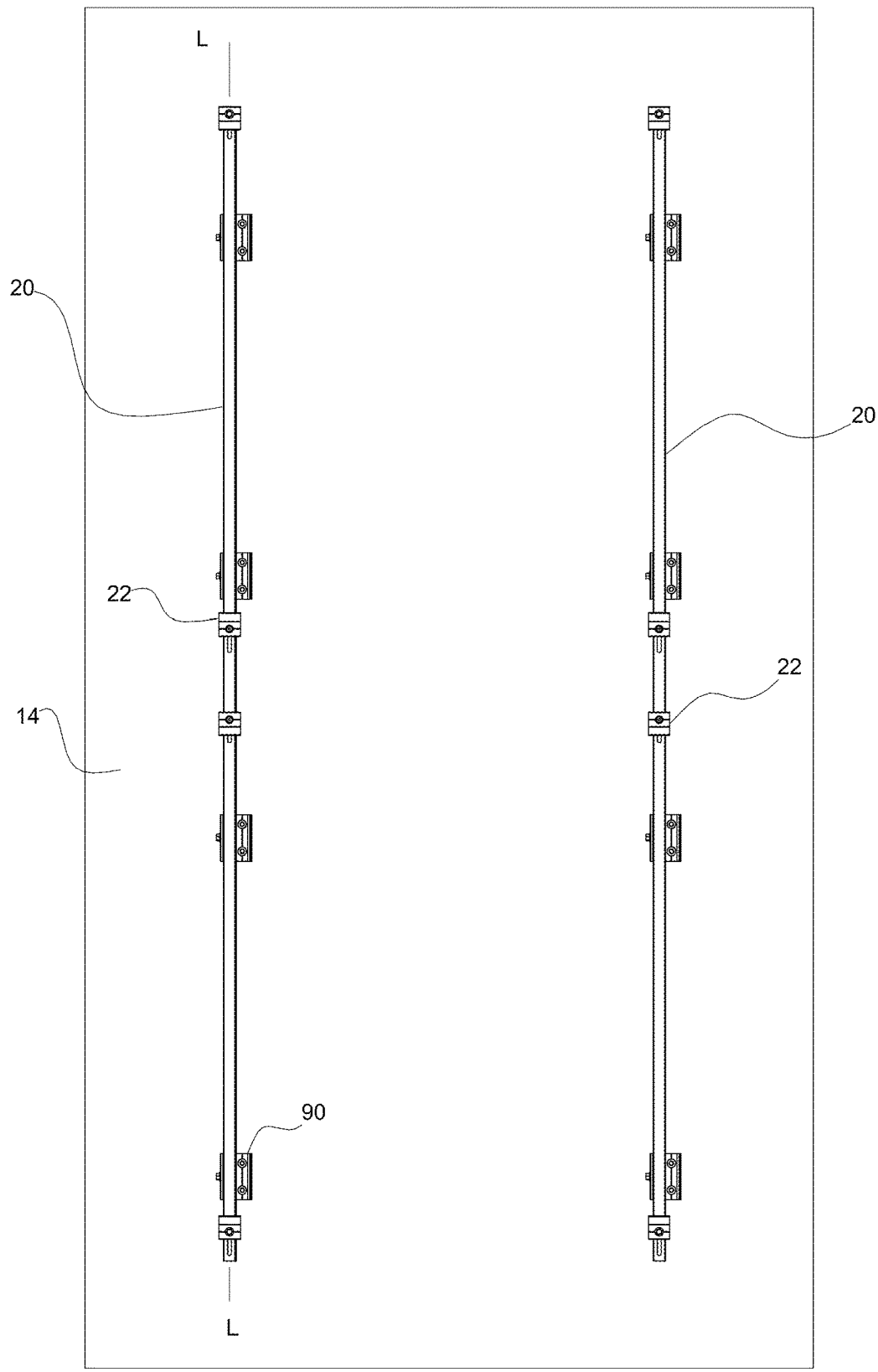
FIG. 7 is a top plan view of a pair of spaced mounting rails secured to a support structure.

With reference to FIGS. 3-5, the mounting frame 18 may consist of two spaced members 18A and 18B extending outwardly from the panel bottom surface 28. Each frame member 18A and 18B has a generally U-shaped configuration with a central portion 32 bounded at its ends by end members 34 extending therefrom. The first and second frame members 18A and B are disposed on the PV panel such that the end members 34 of the first and second frame members are in spaced opposed relation to each other forming a gap 36 therebetween. The gap may provide a clearance for junction boxes and/or wiring. The mounting frame 18 is offset from each of the PV panel perimeter edges 23 such that a lip portion 38 of the PV panel 16 extends outwardly beyond the mounting frame 18. In one embodiment, the PV panel 16 may have a rectangular configuration having long sides and short sides as shown in FIG. 3. The frame central portion 32 may extend along the long side of the panel and the end members 34 may extend along the panel short sides. However, it is contemplated that the frame members 18 may be orientated with respect to the panel 16 such that the central portion 32 runs along the panel short side and the end members 34 extend along the panel long sides. The mounting frame 18 provides a structure for mounting the module to the spaced mounting rails 20 as shown in FIG. 7. As will be described below, the mounting rails 20 are secured to a support structure 14 such as a roof.

With reference to FIGS. 5-8, the mounting frame 18 includes a base 40 from which extends outwardly a central section 42. The central portion ends in a top portion 44 that has a generally planar surface 46, which engages the PV panel bottom surface 28. The planar frame surface 46 may be secured to the PV panel by an adhesive layer 48. It is also within the contemplation of the present disclosure that the frame 18 may be attached with mechanical fasteners extending through through-holes formed in the PV panel 16. The frame base 40 has a projection which forms a foot 50 extending outwardly therefrom having a ramped surface 52. Extending from the frame base 40 in an opposite direction from the foot 50 may be a generally planar flange 54. The foot 50 is adapted to engage a retaining device 22 for securing the PV module 12 to the mounting rails 20 as will be described below. The base central section 42 may include a channel 56 bounded by side walls 58. The frame 18 may be formed of a metallic material such as aluminum or steel.

Figure 8:
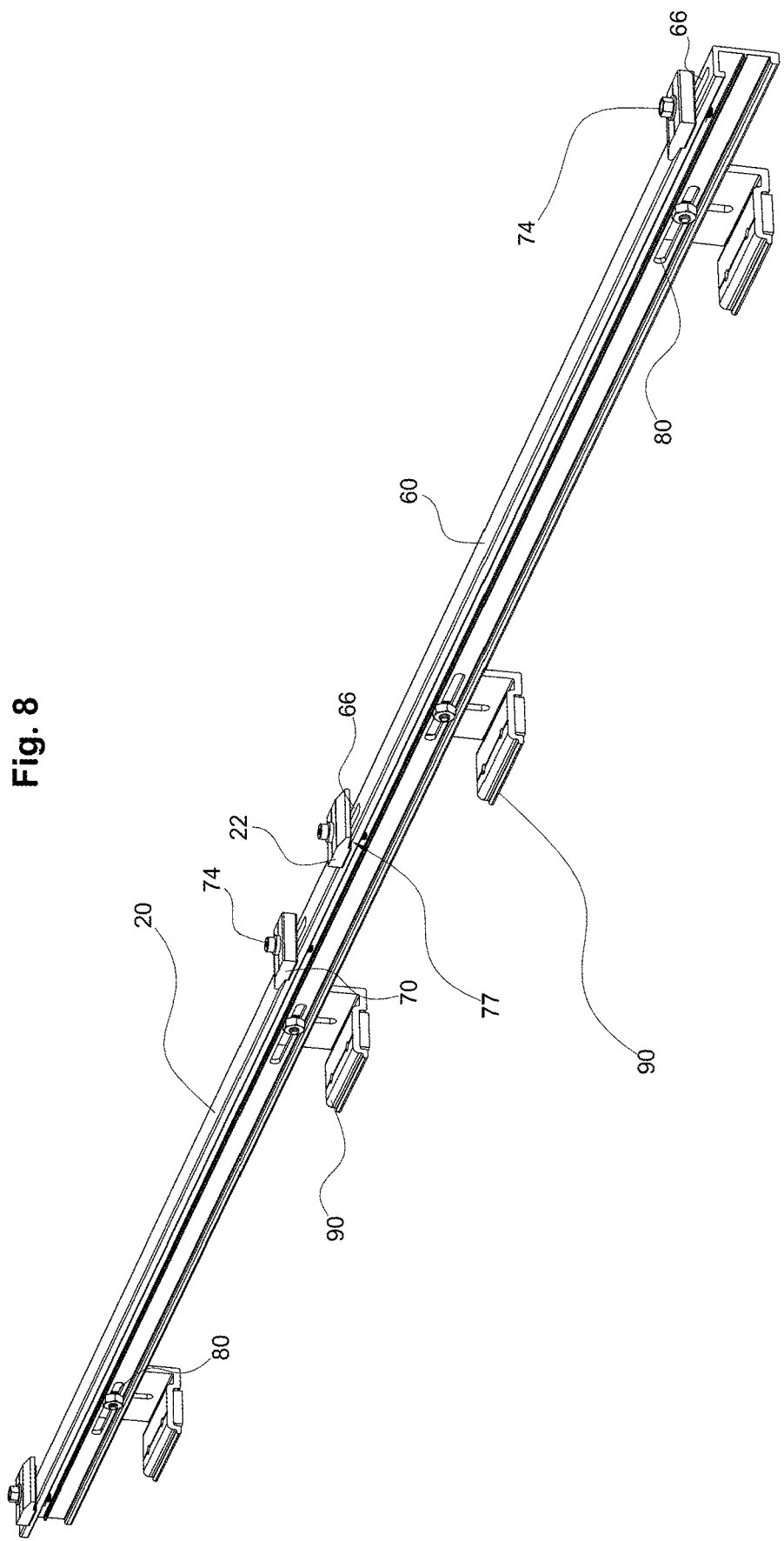
FIG. 8 is a side perspective view of a mounting rail.
Figure 9:
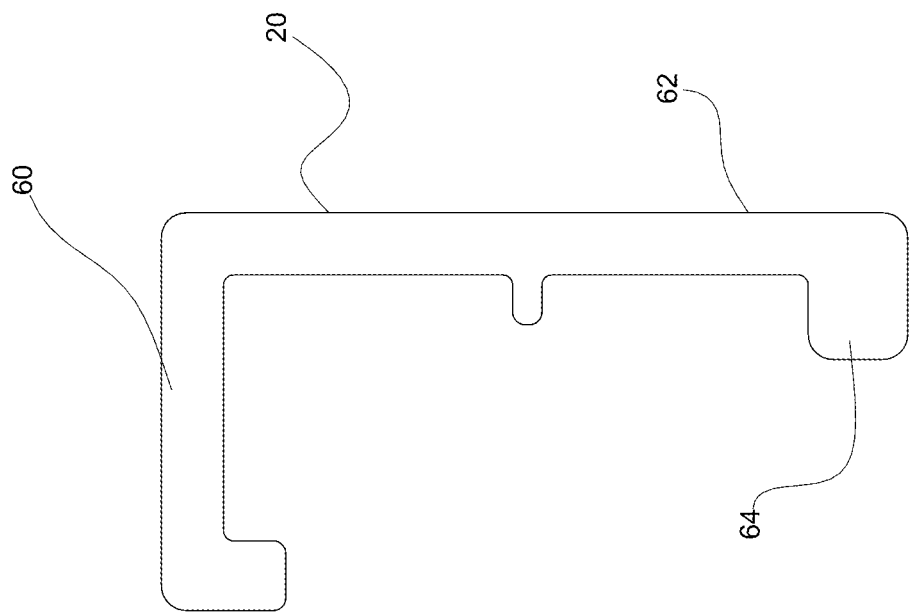
FIG. 9 is an elevational end view of the mounting rail.

With reference to FIGS. 2, 6-9, the PV modules 12 are mounted to a support structure 14 via the mounting rails 20. In a preferred embodiment, two spaced mounting rails 20 are used to support the PV modules 12 extending therebetween. In a typical installation of the PV modules 12 on a support structure 14 such as roof, there may be a plurality of pairs of mounting rails in order to support an array of PV modules. The PV modules 12 may be electrically connected in order to supply generated electricity to a power system. Each mounting rail 20 may include a longitudinally extending member having a planar mounting surface 60 extending along the longitudinal axis L-L of the mounting rail. A sidewall 62 extends from an edge of a mounting surface 60 toward a bottom flange 64. The bottom flange 64 extends outwardly from the wall in the same direction as the mounting surface extends from the opposed end of the sidewall 62 as shown in FIG. 9.

With specific reference to FIG. 8, the mounting surface 60 includes an adjustment element 66 that permits the retainer 22 to be positionally adjusted along the length of the mounting rail. The adjustment element may be in the form of a plurality of slots 66 spaced from each other and extending in a direction along the longitudinal axis L-L of the mounting rail as shown in FIGS. 7-8. Alternatively, adjustment element 66 may be a continuous slot or channel extending along the length of the mounting rail 20. In this embodiment, the retainers 22 could be positioned at any location along the length of the rails 20 with use of a channel nut or other fastener.

With reference to the embodiment shown in FIGS. 5, 7, and 8, one of the retainers 22 is operably connected to the mounting surface 60 adjacent each of the slots 66. The retainers 22 secure the PV modules 12 via the mounting frame 18 to the mounting rails 20. Each retainer has a retainer body 70 including a hole 72 extending therethrough in order to receive a fastener 74. The fastener 74 extends through the retainer 22 and through the slot 66. When the fastener 74 is in an untightened state the retainer 22 may be positionally adjusted along the longitudinal axis of the mounting rail 20. The fastener 74 when in a tightened state clamps the retainer 22 to the rail 20 and positionally fixes the retainer 22 relative thereto.

The retainer body 70 has a bottom surface 76 which engages the rail mounting surface 60. The bottom surface 76 may have a series of ridges 75 (FIGS. 2 and 6) that help engage the mounting surface 60 and prevent slippage. Extending outwardly from the body 70 is a ramped projection 78 which is spaced from the mounting surface in order to allow module frame foot 50 to extend underneath. The projection 78 and mounting surface 60 define a space 77 therebetween (FIG. 8) in which the frame foot 50 may extend in order to secure the module 12 to the rail 20. The projection 78 has a bottom surface 79 which tapers as it extends from the retainer body toward a distal end. The adjustment element 65 in which the retainer 22 can slide allows the installer to position the PV module 12 in the desired position such that the frame foot 50 may be slid underneath the retainer projection 78. The fastener 70 may then be tightened to urge the retainer projection 78 into engagement with the frame foot 50 thereby clamping the module frame to the rail and fixedly securing the module 12 to the support structure. The retainer 22 may engage the frame at any location along a length of the frame's central portion 32 or end members 34. Therefore, the position of the PV module 12 can easily be adjusted.

Since the mounting frame 18 extends along a significant portion of the PV module, connection between the PV module and the mounting rail can occur at almost any location along the length of the frame. Therefore, rail placement does not need to be exact. This reduces the time spent on laying out and fitting the various components during installation.

The retainers 22 may be preinstalled on the rails 20 such that the installer need only slide the retainer in place and tighten it down. This greatly simplifies the module installation process. Additionally, in the embodiment wherein the adjustment element is a plurality of discrete slots 66, the slots 66 formed on the mounting surface of the rail may be set at a distance in order to accommodate the mounting frame.

With reference to FIG. 8, the mounting rails 20 may further include a slotted channel 80 formed in the rail sidewall. The channels 80 may extend in the longitudinal direction of the rail L-L. The channels 80 may include a plurality of discrete channels as shown in FIG. 8. Alternatively, there could be one long channel extending along substantially the entire length of the rail. These channels accommodate the attachment of a mounting bracket 90 which secures the rail to a support structure such as the roof of a house or building.

Figure 10:
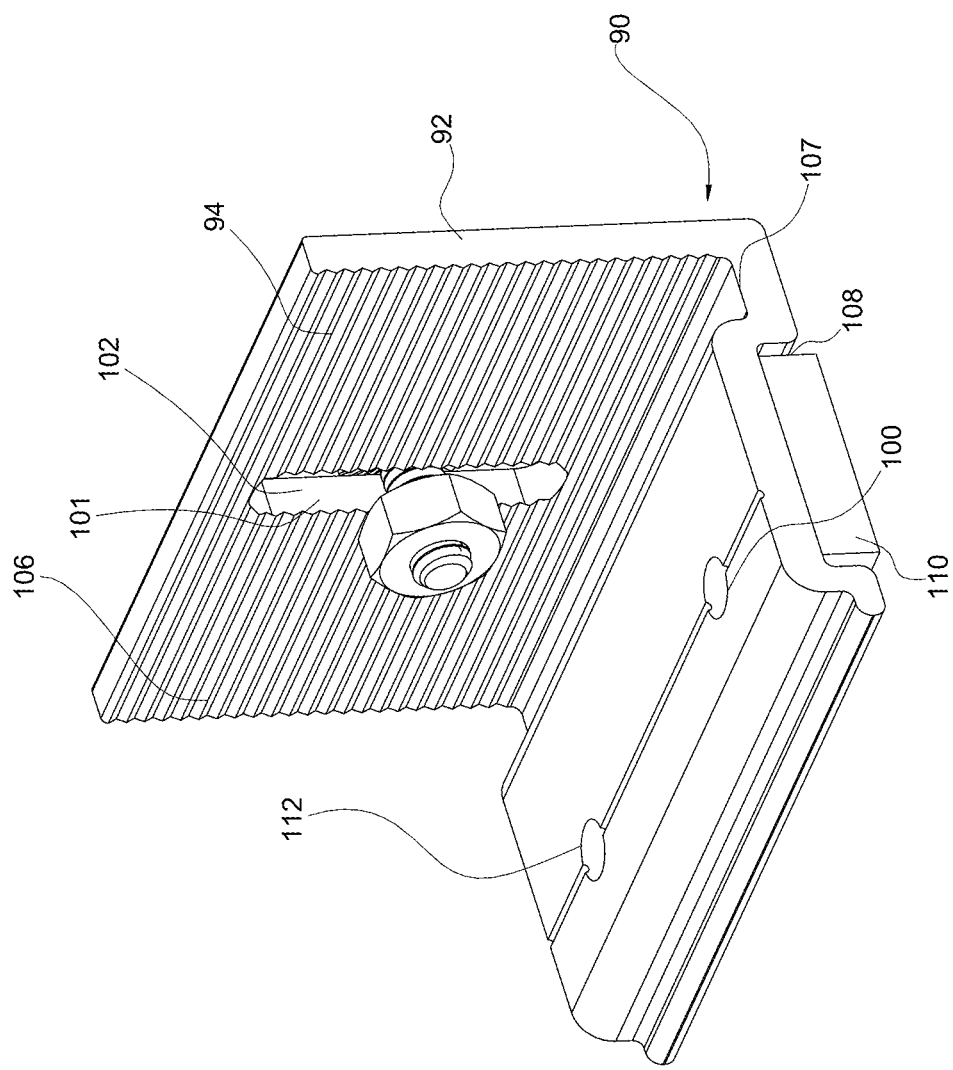
FIG. 10 is a perspective view of a mounting bracket.

With references to FIGS. 2, 8 and 10-11, the mounting bracket 90 may be an L-shaped member having a wall 92 including a front face 94 and an opposed rear face 96. The wall 92 may have a bottom edge 98 from which a base 100 extends outwardly therefrom in a generally orthogonal orientation. The wall 92 may have an elongate passage 101 extending along the vertical extent of the wall in order to accommodate a fastener 104 extending therein. The fastener 104 may extend through the bracket 90 and into and through the slotted channel 80 of the mounting rail for securing the bracket 90 to one of the mounting rails 20. The elongate passage permits the rail 20 to be positionally adjusted along the height of the base wall. The passage 101 may be in the form of a slot 102 extending through the bracket wall 92 as shown in FIG. 10. Alternatively, the passage 101 could be in the form of a channel extending along the height of bracket wall 92. When the desired height of the rail is achieved, the fastener 104 can be tightened, thereby securing the rail 20. The base 100 may include a channel 107 to accommodate the rail bottom flange 64.

The passage 101 in the bracket wall 92 is generally perpendicular to the slotted channel 80 in the mounting rail 20. Accordingly, the connection between the mounting rail 20 and the bracket 90 permits the mounting rail to be adjusted in two degrees of freedom that are generally perpendicular to each other. For example, one degree may be a generally vertical axis and the other being a generally horizontal axis when the mounting rail is secured to the structure. The terms vertical and horizontal are used for clarification purposes and are not intended to be limiting. This adjustability ensures that the gaps between the PV modules 12 may be correct and consistent. In addition, the passage 101, which is generally perpendicular to the surface of the support structure 14 allows for the rails 20 and PV modules 12 thereon to be leveled with respect with each other. This adjustability permits the PV modules 12 to be uniformly aligned and leveled. It also permits the gap G (FIG. 2) between the PV panel 16 and the support structure 14 to be adjusted.

Once the mounting rail 20 is in the desired location, the fastener 104 can be tightened in order to secure the rail to the bracket 90. In addition, the bracket wall front face 94 may include a plurality of ridges 106 which engage the mounting rail sidewall 62 upon tightening of the fastener. The ridges 106 help to dig into the sidewall 62 to prevent movement between the mounting rail and the bracket.

The mounting bracket base 100 may include a U-shaped recess 108 extending along the width of the bracket. The recess may accommodate a block of elastomeric material 110. This material may be formed of butyl rubber or other elastomeric-type material. The base 100 may also include a plurality of mounting holes 112 extending therethrough. The mounting holes accommodate a fastener 114 which extends through the base and through the elastomeric material and ultimately into a support structure. The elastomeric material forms a seal around the mounting fastener to prevent water from intruding into the support structure adjacent the fasteners.

With the PV modules mounted to the rails 20, all connections between the PV modules and the mounting rails are disposed beneath the active surface of the PV module. As shown in FIG. 1, from a top view the mounting elements are not visible. Therefore, a clean and uninterrupted continuous panel surface is presented.

It will be appreciated that various of the above-disclosed features and functions, or alternatives thereof, may be desirably combined into many other different apparatus and systems. It will also be appreciated that various presently unforeseen or unanticipated alternatives, modifications, variations, or improvements therein may be subsequently made by those skilled in the art which are also intended to be encompassed by the disclosed embodiments and the following claims.

What is claimed is:

1. A photovoltaic mounting system comprising:
    a photovoltaic module including a panel including an upper surface having a plurality of photocells and an opposed bottom surface, the panel being bounded by a perimeter edge; and
    a mounting frame secured to the bottom surface of the panel, the mounting frame being inset with a distance from the perimeter edge of the panel, wherein a lip portion of the panel extends beyond the mounting frame, the mounting frame including an upper surface secured to the panel and an opposed lower end having a mounting projection, and the mounting frame including a plurality of spaced frame members having a gap extending between the plurality of spaced frame members;
    the plurality of spaced frame members includes a first frame member and a second frame member, the first frame member has an elongate central portion extending along, and inset from, the perimeter edge and an elongate end portion projecting outwardly from the elongate central portion of the first frame member and extending along, and inset from, the perimeter edge; and
    the second frame member has a elongate central portion extending along, and inset from, the perimeter edge and an elongate end portion projecting outwardly from the elongate central portion of the second frame member and extending along, and inset from, the perimeter edge, wherein the elongate end portion of the first frame member and the elongate end portion of the second frame member extend toward each other and are in spaced opposed relation to each other on the opposed bottom surface of the panel forming the gap between the spaced frame members.

2. The mounting system as defined in claim 1, wherein the first and second frame members each have a generally U-shaped configuration with the elongate end portion of each of the first and second frame members extending perpendicular from the elongate central portion of each of the first and second frame members.

3. The mounting system as defined in claim 1, further including a plurality of spaced mounting rails having a plurality of retainers thereon, the plurality of retainers engaging the mounting frame for securing the photovoltaic module to the plurality of spaced mounting rails.

4. The mounting system as defined in claim 3, wherein the plurality of mounting rails each include a mounting surface and the retainers include a portion extending above the mounting surface and defining a space between the plurality of mounting rails, the space adapted to receive the mounting projection of the mounting frame.

5. The mounting system as defined in claim 4, wherein the mounting surface includes an adjustment element thereon, the retainers being disposed above the adjustment element and secured by a fastener thereto, wherein a position of the retainers may be adjusted along a longitudinal axis of the plurality of the spaced mounting rails.

6. The mounting system as defined in claim 5, wherein the plurality of mounting rails are secured to a support structure by a mounting bracket.

7. The mounting system as defined in claim 6, wherein the mounting bracket includes an L-shaped member having a base and a wall extending upwardly therefrom, the wall including a single elongate passage thereon extending along more than half the height of the wall, the passage receiving a fastener therethrough, and each of the plurality of the mounting rails including a sidewall having a channel extending along a longitudinal axis thereof, the channel being generally perpendicular to the passage formed on the bracket, the fastener cooperating with the passage and the channel in the mounting rail for securing the mounting rail to the bracket, wherein the position of the mounting rail relative to the bracket is two axes generally perpendicular to each other.

8. The mounting system as defined in claim 3, wherein the plurality of retainers are each secured to the plurality of mounting rails by a fastener, and the plurality of retainers clamping the mounting frame to the mounting rail upon tightening of the fastener, and wherein the position of the mounting frame can be adjusted prior to securing the retainers to the rail by the fastener.

9. The mounting system as defined in claim 6, wherein the mounting bracket includes a bottom portion and the bottom portion includes a recess, an elastomeric material disposed in the recess.

10. A photovoltaic module comprising:
a photovoltaic panel having an upper surface including a plurality of photocells and an opposed bottom surface, the photovoltaic panel being bounded by a panel perimeter including a perimeter edge; and
a mounting frame secured to a panel bottom surface, the mounting frame being offset from the perimeter edge of the photovoltaic panel, wherein a lip portion of the photovoltaic panel extends beyond the mounting frame, the mounting frame including an upper surface secured to the panel and an opposed lower end having a mounting projection adapted to secure the photovoltaic module to a rail, wherein the mounting frame includes a first frame member and a second frame member each having a plurality of elongate members wherein the first and second frame members are secured to the panel bottom surface in opposed spaced relation to each other, and the first frame member and the second frame member each have a central portion having two opposed end members extending from the central portion to form a generally U-shaped configuration, the first and second frame members being disposed on the panel bottom surface, wherein the end members of the first frame member extend outwardly from the first frame member central portion along the panel bottom surface, and the end members of the second frame members extend outwardly from the second frame member central portion along the panel bottom surface, wherein the end members of the first frame member and the end members of the second frame members extend toward each other and are in spaced opposed relation to each other forming a gap between the first frame member and the second frame member.

11. The photovoltaic module as defined in claim 10, wherein the end members of the first and second frame members extend generally perpendicular from their respective central portion.

12. The photovoltaic module as defined in claim 10, wherein the photovoltaic panel perimeter edge is unbounded by a perimeter frame.

* * * * *